United States Patent
Welin et al.

(10) Patent No.: US 9,820,182 B2
(45) Date of Patent: Nov. 14, 2017

(54) METHOD FOR ENABLING CONTROL OF DATA PACKET FLOWS BELONGING TO DIFFERENT ACCESS TECHNOLOGIES

(71) Applicant: TELEFONAKTIEBOLAGET L M ERICSSON (PUBL), Stockholm (SE)

(72) Inventors: Annikki Welin, Solna (SE); Lars Hallström, Vaxholm (SE); Johan Kölhi, Vaxholm (SE); Tomas Thyni, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 165 days.

(21) Appl. No.: 14/900,701

(22) PCT Filed: Jul. 12, 2013

(86) PCT No.: PCT/SE2013/050901
§ 371 (c)(1),
(2) Date: Dec. 22, 2015

(87) PCT Pub. No.: WO2015/005839
PCT Pub. Date: Jan. 15, 2015

(65) Prior Publication Data
US 2016/0135074 A1    May 12, 2016

(51) Int. Cl.
*H04W 28/02* (2009.01)
*H04L 29/06* (2006.01)
(Continued)

(52) U.S. Cl.
CPC ..... *H04W 28/0268* (2013.01); *H04L 12/4633* (2013.01); *H04L 45/7453* (2013.01);
(Continued)

(58) Field of Classification Search
None
See application file for complete search history.

(56) References Cited

U.S. PATENT DOCUMENTS 6,865,185 B1 * 3/2005 Patel ............... H04L 47/12
370/310
7,280,540 B2  10/2007 Halme et al.
(Continued)

FOREIGN PATENT DOCUMENTS

WO    2013089603 A1    6/2013

OTHER PUBLICATIONS

Kent, IP Encapsulating Security Payload (ESP), RFC 4303, BBN Technologies, Dec. 2005.
(Continued)

*Primary Examiner* — Hicham Foud

(57) ABSTRACT

The present invention relates to embodiments of nodes and methods in a node in a data telecommunication network. The method and embodiments thereof enables control of data packet traffic belonging to different access technologies to be sent with the same Quality of Service class over an aggregated encrypted Internet Security tunnel, IPsec tunnel. The received data packets are encrypted and encapsulated as payload in an IP data packet to be sent over an aggregated encrypted IPsec tunnel, which header is marked with an access technology index comprising a code for the identified access technology of the one or more received data packets encrypted and encapsulated as payload in the IPsec tunnel and a hash identifier code enabling enhanced scheduling and routing.

26 Claims, 9 Drawing Sheets

(51) Int. Cl.
*H04W 12/02* (2009.01)
*H04W 88/06* (2009.01)
*H04W 28/10* (2009.01)
*H04L 12/46* (2006.01)
*H04L 12/857* (2013.01)
*H04W 40/02* (2009.01)
*H04L 12/743* (2013.01)
*H04L 12/833* (2013.01)

(52) U.S. Cl.
CPC ...... *H04L 47/2491* (2013.01); *H04L 63/0272* (2013.01); *H04L 63/0428* (2013.01); *H04L 63/164* (2013.01); *H04L 65/80* (2013.01); *H04W 12/02* (2013.01); *H04W 28/10* (2013.01); *H04W 40/02* (2013.01); *H04W 88/06* (2013.01); *H04L 47/31* (2013.01)

(56) References Cited

U.S. PATENT DOCUMENTS

| | | |
|---|---|---|
| 2005/0088977 A1 | 4/2005 | Roch et al. |
| 2008/0002579 A1* | 1/2008 | Lindholm ........... H04L 12/4641 370/230 |
| 2009/0016282 A1* | 1/2009 | Gasparroni ............. H04L 45/24 370/329 |
| 2010/0322215 A1* | 12/2010 | Keller ............... H04W 36/0066 370/338 |
| 2012/0230194 A1 | 9/2012 | Matthews et al. |
| 2014/0321283 A1* | 10/2014 | Thyni .................... H04L 47/14 370/235 |

OTHER PUBLICATIONS

Kent, IP Authentication Header, Network Working Group Request for Comments: 4302, Dec. 2005.

Arkko, et al., IANA Allocation Guidelines for the Protocol Field, Network Working Group Request for Comments: 5237, Feb. 2008.

R. Thayer et al. "IP Security Document Roadmap" RFC 2411, Nov. 1998, 11 pages.

* cited by examiner

METHOD FOR ENABLING CONTROL OF DATA PACKET FLOWS BELONGING TO DIFFERENT ACCESS TECHNOLOGIES This application is a 371 of International Application No. PCT/SE2013/050901, filed Jul. 12, 2013, the disclosure of which is fully incorporated herein by reference.

TECHNICAL FIELD

The present disclosure relates to the technical field of mobile telecommunication. In more detail, the following disclosure presents embodiments of nodes in telecommunication networks and methods in said nodes, said methods supporting scheduling and routing of IPsec tunnels.

BACKGROUND

It starts to be a common request from the network operators to share a common transport for multiple radio technologies in Radio Base Stations, RBSs, with multiple radio technologies with data traffic belonging to the same QoS class from each technology.

RBSs are developed to be placed both inside and outside buildings for serving the users and their telecommunications equipment. The casing of an RBS can contain both antennas and telecommunications circuitry. Further, the antennas and telecommunications circuitry is designed to serve a number of different Radio Access Technologies, RATs, such as WCDMA (Wideband Code Division Multiple Access), GSM (Global System for Mobile Communications), LTE (Long Term Evolution), Wi-Fi (Wireless Fidelity, also abbreviated WIFI, WI-FI, WiFi). The backhauling is based on the Internet Protocol, IP. Thus, despite RAT, all transfer of the data packets will be performed over an IP infrastructure instead of multiple, parallel dedicated network structures that are technology adapted. The one and same IP infrastructure solution has a number of advantages, e.g. simplicity, known technology, low investment costs, over a solution where each RAT is served separately resulting in separate wiring or packet infrastructure from each RBS. Thus, all data packets will be forwarded on the same wire or in the same optical fibre and packet infrastructure irrespective of the RAT a data packet originates from.

The design of the RBSs provides the possibility to cascade a number of RBSs. Each RBS is therefore provided with a switching/routing possibility. However, in a scenario wherein a large number of RBSs are aggregated in the network, and a large number of user equipments are active at the same time, this might result in congestion in the data traffic.

In small cell networks IPsec is commonly used. In one IPsec tunnel, there can be several type of radio traffic. The problem with the heterogeneous networks using IPsec is that the traffic is classified and treated in a same way, without any consideration of traffic characteristic or the type of radio access, e.g. LTE, WiFi, 3G.

Tests of congestion situations have shown that if the same Quality of Service, QoS, class is used for data packets to/from different RATs, normal scheduling will not forward data packets in a fair manner irrespective of the RAT that the data packets originate from when the data traffic from different RATs are mixed on the same wire and in the same IPsec tunnel. In the tests, the Best Effort QoS class was used for all data packet traffic. Instead of an equal and fair distribution of data packets using only a QoS based scheduling, the result became an uneven distribution between radio technologies.

Different radio access technologies such as 3G, LTE, and WiFi have different delay between the UE and application server, due to the Round Trip Time (RTT) being different depending on the radio access technology. The reason for different delay in different radio access technologies is caused by the termination point of the radio protocols as well as different radio characteristics. In 3G the Radio Network Controller (RNC) is involved in termination of radio protocols, in WiFi the access points terminates radio protocols.

There is no existing solution for accomplishing fairness between data packets originating from different access technologies when transported in an encrypted tunnel. It is impossible for the scheduler to detect and schedule data traffic flows from different technologies having the same QoS class, i.e. Quality of Service class.

SUMMARY

It is an object of the following described embodiment to provide solutions for identifying data traffic flows in an IPsec tunnel with the same QoS class belonging to different radio access technologies to be able to give these flows different treatment to achieve fairness.

According to one aspect, embodiments of a method in a node in a data telecommunication network are provided. The method and embodiments thereof enables control of data packet traffic belonging to different access technologies to be sent with the same Quality of Service class over an aggregated encrypted Internet Security tunnel, IPsec tunnel. A data packet flow is received and which radio access technology each received data packet belongs to is identified. Further, the method and embodiments thereof comprise encrypting and encapsulating one or more received data packets as payload in an IP data packet to be sent over an aggregated encrypted IPsec tunnel and marking a header of the IPsec tunnel with an access technology index comprising a code for the identified access technology of the one or more received data packets encrypted and encapsulated as payload in the IPsec tunnel. The data packets are then sent via the IPsec tunnel.

According to further one aspect, a node and embodiments thereof in a data telecommunication network are provided. The node comprises means for enabling control of data packet flow belonging to different access technologies to be sent with the same Quality of Service class over an aggregated encrypted Internet Protocol security tunnel, IPsec tunnel. Said means comprises a receiver configured to receive data packet flow and to identify which access technology each received data packet belongs to. Said means further comprises encrypting means configured to encrypt and encapsulate one or more received data packets as payload in an IP data packet to be sent over an aggregated IPsec tunnel, and marking means being configured to mark a header of the IPsec tunnel with an access technology index comprising a code for the identified access technology of the one or more received data packets encrypted and encapsulated as payload in the IPsec tunnel. Said means further comprises a sender configured to send the IP data packets via the aggregated encrypted IPsec tunnel.

According to yet another aspect, a method and embodiments thereof are presented. Said method provides scheduling and/or routing or switching of IPsec tunnels in a node of an access network or transport network of a data telecommunication network. The method comprises receiving one or more IPsec tunnels comprising IP data packets, each IPsec tunnel being marked in the header with an access technology index indicating the access technology from which a data packet originated and a hash identifier code to be used in the calculation of a hash code, and scheduling and routing/switching of the IPsec tunnels by means of the access technology index indicated in the IPsec tunnel header.

According to further one aspect, a node and embodiments of said node in an access network or transport network of a data telecommunication network are provided. The node comprises routing or switching functionality means, said means being adapted to receive one or more IPsec tunnels comprising IP data packets, each IPsec tunnel being marked in the header with an access technology index indicating the access technology from which a IP data packet originated and a hash identifier code for calculating a hash code. The routing or switching functionality means is controlled by a controller which control the scheduling and routing/switching of the IPsec tunnels by means of the access technology index indicated in the IPsec tunnel header.

According to further one aspect, a node and embodiments thereof enables control of data packet flows belonging to different access technologies to be sent with the same Quality of Service class over an aggregated encrypted Internet Protocol security tunnel, IPsec tunnel. Said node comprises a processor and memory. Said memory contains instructions executable by said processor whereby said node is operative to receive data packet flows, to identify which access technology each received data packet belongs to, to encrypt and encapsulate one or more data received packets as payload in an IP data packet to be sent over an aggregated encrypted IPsec tunnel, to mark a header of the IPsec tunnel with an access technology index comprising a code for the identified access technology of the one or more received data packets encrypted and encapsulated as payload in the IPsec tunnel, and to send the IP data packets via the aggregated encrypted IPsec tunnel.

According to further one aspect, a node and embodiments thereof are provided for scheduling and/or routing or switching of IPsec tunnels in a node of an access network or transport network of a data telecommunication network. The node comprises a scheduler, routing or switching functionality. Said node further comprises a processor and memory. Said memory contains instructions executable by said processor whereby said node is operative to the method, which comprises receiving one or more IPsec tunnels comprising IP data packets. Each IPsec tunnel is marked in the header with an access technology index indicating the access technology from which a data packet originated and a hash identifier code to be used in the calculation of a hash code. The method comprises also scheduling and routing/switching the IP data packets by means of the access technology index indicated in the IPsec tunnel header.

One advantage with the above described embodiments wherein an access technology index is inserted in the header of the IPsec tunnel is that it makes it possible to differentiate the data flow based on radio or fixed access technologies even if they belong to the same traffic class, i.e. require the same Quality of Service, and the IP packets are sent inside the same IPsec tunnel from a node, e.g. a Radio Base Station.

Further one advantage is that the access technology index enables load balancing using the hashing identifier between different routes/paths in a data and telecommunication network and hierarchical QoS scheduling.

BRIEF DESCRIPTION OF THE DRAWINGS

The foregoing, and other, objects, features and advantages of the present embodiments will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the proposed embodiments. However, it will be apparent to one skilled in the art that the proposed embodiments may be practiced in other embodiments that depart from these specific details. In other instances, detailed descriptions of well known methods, devices, and circuits are omitted so as not to obscure the description of the present invention with unnecessary detail.

Figure 1:
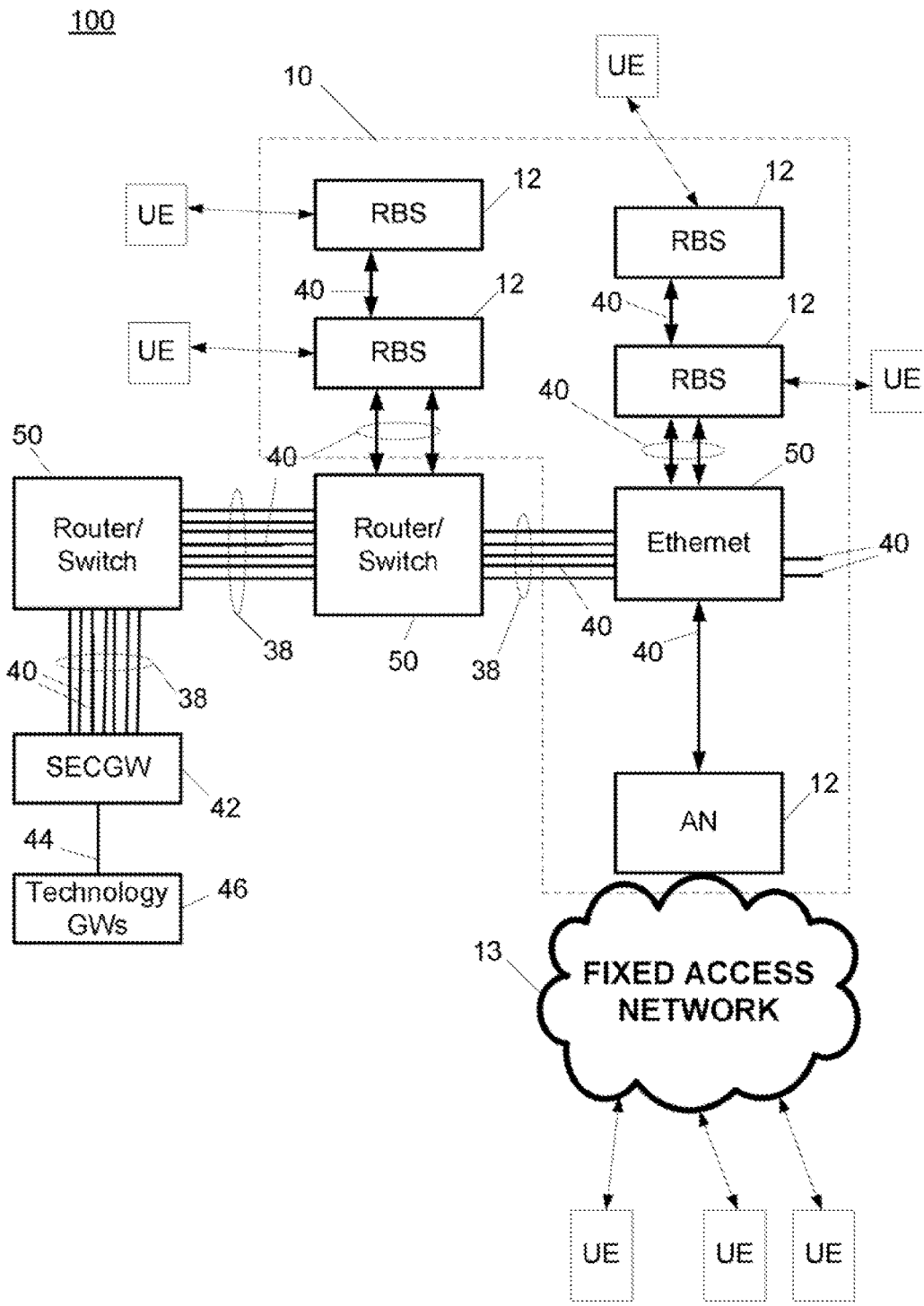
FIG. 1 is a block diagram of an exemplary network in which embodiments of entities and methods described herein is implemented.

FIG. 1 illustrates a data telecommunications network 100 involving a Radio Access Network, RAN, 10. The RAN 10 comprises a number of Radio Base Station, RBS, nodes 12, which are enabled to serve one or more Radio Access Technologies RATs, e.g. such as WCDMA, GSM, LTE, WIFI. Thus, a plurality of User Equipments may be wirelessly connected to an RBS via different RATs simultaneously, but an UE is usually only using one of the available RATs for the connection with the RBS. The backhauling or the transport network is based on the Internet Protocol, IP. Further, a plurality of User Equipments may get access to the backhauling or transport network via fixed access technologies 13 connected to an access node 12, comprising different fixed access modules, e.g. modem, switch, router, etc., for fixed access by means of fixed access technologies e.g. ADSL, ADSL+, VDSL2, Cable/Coax, CAT6, 2P2 Ethernet, etc. Thus, despite RAT, all transfer of the data packets will be performed over an IP infrastructure. Due to the RAN security requirement, the IP data packet traffic/flows to and from the RBSs 12 are transferred in IP Security tunnels, IPsec tunnels or other types of encrypted tunnels. Each RBS 12 is designed to send and receive data packets flow in one IPsec tunnel for further transfer over dedicated mobile backhaul networks, virtual private network services or over the Internet. The data packets are sent via a conductor 38, e.g. copper wiring, optical fibre, etc. Thus, an IPsec tunnel starts or ends at an RBS, which is situated in a node 12 of the RAN. The RAN may also comprise a number of nodes 50 with routing and/or switching functionality, e.g. Ethernet switches, Route/Switch entities, etc. The RBSs may also be provided with routing and/or switching functionality for enabling cascade connection of RBSs, as illustrated in both FIG. 1 and FIG. 2. Thus, both nodes 12 and node 50 comprise routing and/or switching functionality involving a scheduler. Said scheduler involves both policing and shaping functionalities.

In the illustrated example, all IPsec tunnels start in a node comprising a RBS or AN, pass through the network and ends in the same node, a SECGW, i.e. a Security Gateway, 42, or directly in another RBS, 12. The IP data packets are forwarded from the SECGW 42 in data paths 44 via technology gateways 46 to their destination addresses. Examples of technology gateways are Serving GPRS Support Node (SGSN), Gateway GPRS Support Node (GGSN), Serving Gateway (SGW), Packet Data Network Gateway (PDN-GW), Broadband Network Gateway (BNG), WiFi Services Gateway (WSG), WiFi/Wireless Access Controller (WAC).

IPsec is an extension to the IP protocol to provide security to the IP level and the upper layer protocols. IPsec architecture is described in RFC2411.

If a node comprising routing means and routing table has two different paths to select between, each data path or routing path in the routing table corresponds to one or more hash codes.

The node comprises a hash algorithm for computing the hash code for an IP data packet flow by means of a 5 tuple of parameters for the IP data packet flow. Said 5 tuple may comprise source IP address, destination IP address, source port number, destination port number and the protocol in use. The hash code is used in the routing table for indicating which of said data paths the IP data packet flow shall be directed to. Thus, data flows having the same hash code will be routed along the same data path. If too many IPsec flows have the same hash code, this might cause congestion in the corresponding data path during heavy IP data packet traffic, while there are other data paths having free bandwidth from the same node.

It is therefore suggested herein solutions for preventing congestion problem over paths in a data communication network comprising radio or fixed access networks. Methods and means for enabling control of data packet flow belonging to different access technologies to be sent with the same Quality of Service class over an aggregated encrypted Internet Protocol security tunnel, IPsec tunnel, are provided hereafter.

To solve the above problem, an Access Technology index, AT index, is proposed to be inserted in the IPsec headers of the IPsec tunnels carrying IP data packet flows. The AT index comprises the access technology code and hash identifier code, which may be used as input in a hash algorithm together with a 5 tuple of input parameters when computing a hash code for distributing IPsec tunnels over different data path in a (data) tele-communications network.

Figure 2:
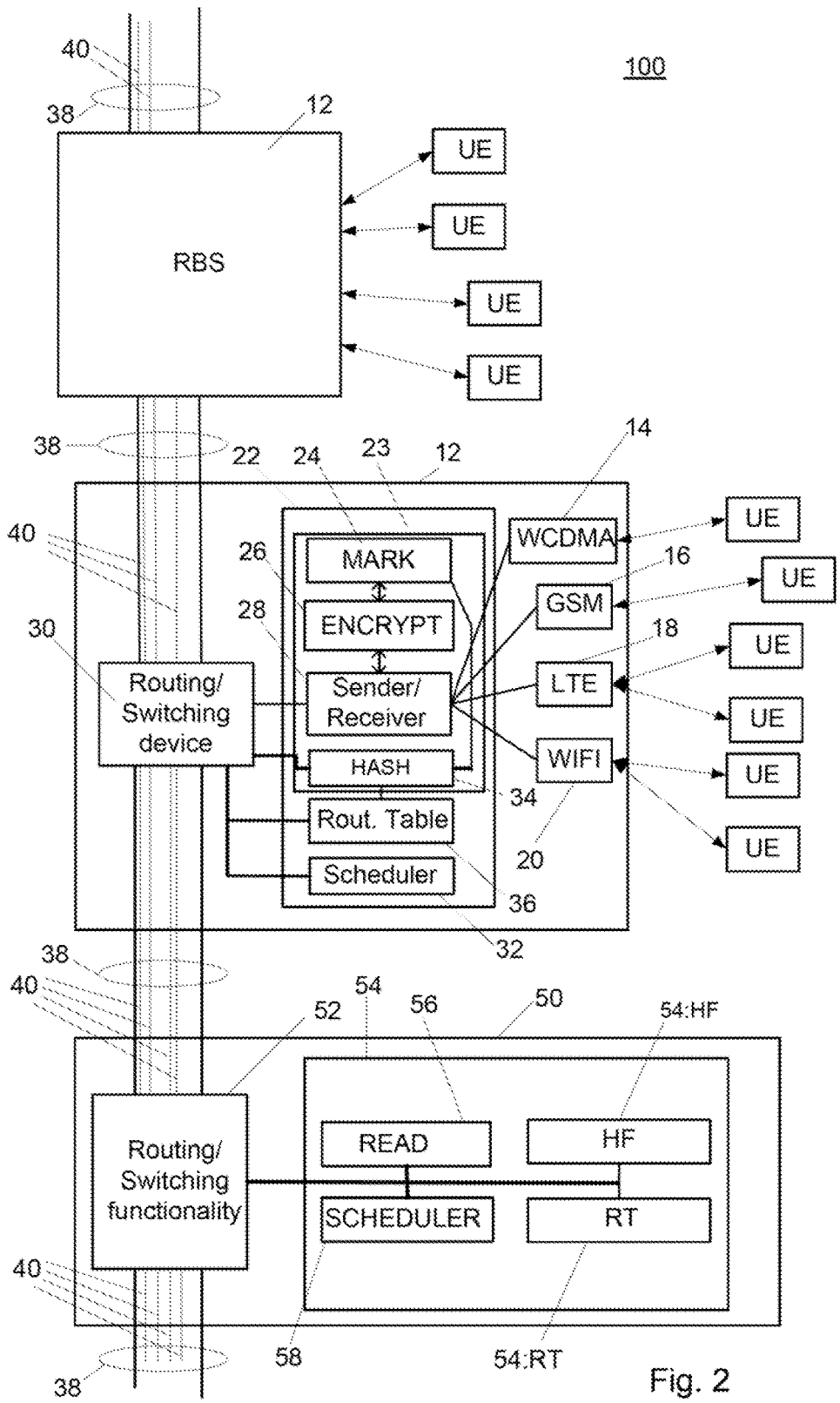
FIG. 2 is a block diagram illustrating different nodes and functionality blocks in said nodes according to one aspect described herein.

FIG. 2 illustrates a part of a telecommunications network 100, comprising cascaded RBSs connected to a node involving routing and/or switching functionality. FIG. 2 comprises also a cross-section of a schematically illustrated RBS, which now will be described in more detail. Many ordinary RBS components and circuits are omitted so as not to obscure the description of the present embodiment with unnecessary details.

In the illustrated embodiment of an RBS, a number of the antennas (not shown) and radio base modules 14, 16, 18, 20 are provided in the RBS. In the illustrated embodiment, the radio base station RBS is provided with a radio base module comprising WCDMA radio access technology circuitry 14, one radio base module comprising GSM radio access technology circuitry 16, one radio base module comprising LTE radio access technology circuitry 18, and one radio base module comprising Wi-Fi radio access technology circuitry 20. The RBS comprises also a controller 22 configured to receive data packets from the radio base modules 14, 16, 18, 20 and loading them into IP data packets. Said controller 22 also comprises marking means 24 configured to mark the header of the IPsec data packets with an Access Technology index, AT index. The AT index comprises an Access Technology (AT) identifier code, and a hash identifier code. The AT identifier code may be a predefined code which identifies which access technology the separate data packets originated from. Thus, there is AT identifier code, or shorter a AT code, for each radio and fixed access technology. The AT code is preferably a unique number for identifying each radio and fixed access technology AT, which number is provided by, e.g. a standard or telecommunication provider. Said AT identifier codes are stored in a table (not shown), e.g. look-up table, connectable to the controller 22 and marking means 24. The AT index comprises further a hash identifier code, which is calculated by means of a hash identifier code calculator 34. Said hash identifier code may be computed by using the port numbers and/or IP-addresses of source and destination nodes of the end users as input parameters in a used hash function. The hash identifier code calculator 34 may be implemented by means of digital processing circuitry and therein executable program software.

The difference between a hash code and a hash identifier code is that the hash code is the result of a hash code computation, while the hash identifier code is an input parameter to the hash code computation.

In the routing table 36, one or more hash codes correspond to a dedicated data path, or routing path, RP. Data flows having the same hash code will be routed along the same data path. It is therefore suggested to distribute IPsec flows to prevent congestion in a data path due to data packet traffic overload and to enable load balancing, i.e. distribute data packet flows between data paths in the communications network, by using the hash identifier code and/or AT identifier code as input parameter together with a 5 tuple of parameters for the IP data packet flow in the hash algorithm for computing the hash code. Optionally, QoS may also be used as input parameter in the hash algorithm.

IPsec tunnels having the same 5 tuple of input parameter values will result in the same hash code and routing path.

The proposed methods provide possibility to distribute IPsec tunnels based on different access technology over different data routes if said IPsec headers are marked with the access technology identifier codes, which are used when calculating the hash codes. Different AT identifier codes will result in different hash codes.

The proposed methods provide further possibility to distribute IPsec tunnels based on different hash identifier codes over different data routes if said IPsec headers are marked with the hash identifier codes, which are used when calculating the hash codes. Different hash identifier codes will result in different hash codes.

Thus, the proposed methods provide the possibility to distribute IPsec tunnels having the same AT identifier code over different data routes based on the AT index comprising access technology identifier code and hash identifier code.

Optionally, QoS may also be used together with the 5 tuple and AT index parameters when calculating a hash code.

Each IP data packet may further be marked with a QoS class based on the traffic class used by the user equipment for the specific service regardless of which access technology each data packet originates from. The controller 22 further comprises marking means 24 which is configured to marking to IPsec tunnel headers thereby enabling identification of the access technology enabling enhanced scheduling treatment based on access technology.

A sender/receiver unit 28 is also provided for sending the IP data packets via a conductor 38, e.g. copper wiring, optical fibre, etc. The IP data packets are packed into an IPsec tunnel 40 and sent by the sender/receiver unit 28 via a routing/switching device 30. The conductor 38 is capable of carrying a plurality of IPsec tunnels 40 at the same time. The routing/switching device 30 handles the upstream and downstream IP data packet flows 40, i.e. in the IPsec tunnels 40 as well as the IPsec tunnel starting in the same node 12 and RBS. The routing/switching device 30 is controlled by the controller 22 comprising a scheduler 32 and a routing table 36.

The radio base modules 14, 16, 18, 20, which are characteristic for an RBS node, are left out in an access node 12 for fixed access technology. However, the access node comprises the controller 22 and routing/switching device 30. The controller also comprises control enablement means 23, i.e. the marking means 24, sender-/receiver unit 28, encryption means 26, routing table 36 and hash code identifier calculator 34, and the scheduler 32

A node 12 comprises means 23, e.g. digital processing circuitry and software, for enabling control of data packet flow belonging to different access technologies to be sent with the same Quality of Service class over an aggregated encrypted Internet Protocol security tunnel, IPsec tunnel. Said means 23 comprises a receiver 28 configured to receive data packet flow from the radio base units or the fixed network. Said receiver 28 is configured to read data packet information and identify which access technology each received data packet belongs to. Said means 23 further comprises encrypting means 26 configured to encrypt and encapsulate one or more received data packets as payload in an IP data packet to be sent over an aggregated IPsec tunnel 40, and marking means 24 being configured to mark a header of the IPsec tunnel with an access technology index comprising a code for the identified access technology of the one or more received data packets encrypted and encapsulated as payload in the IPsec tunnel. Said means 23 further comprises a sender 28 configured to send the IP data packets via the aggregated encrypted IPsec tunnel 40. The means 23 may optionally comprise a routing table 36, which may store hash codes and hash identifier codes.

According to further one aspect, a node 50 and embodiments of said node 50 in an access network or transport network 10 of a data telecommunication network are provided. The node 50 comprises routing or switching functionality means 52, which is adapted to receive one or more IPsec tunnels 40 comprising IP data packets. Each IPsec tunnel is marked in the header with an access technology index indicating the access technology from which an encapsulated IP data packet originated and a hash identifier code for calculating a hash code. The routing or switching functionality means 52 is controlled by a controller 54 which control the scheduling and routing/switching of the IPsec tunnels by means of the access technology index indicated in the IPsec tunnel header.

Thus, a data telecommunication network 100 may comprise one or more nodes 50 comprising routing and/or switching functionality means 52, said device 52 being adapted to receive and forward IP data packets. Each IPsec tunnel is marked in the header with an AT index. The routing or switching functionality means 52 is controlled by a controller 54 which comprises a reader unit 56, which is configured to read and check the headers of the IPsec data packets. The controller 54 further comprises a scheduler 58 that schedules the data packets according the AT index and a scheduling policy dedicated to the node and the routing/switching device 52. The header of an IPsec tunnels in an IP tunnel 40 comprises the AT index and a pre-set access technology scheduling policy enables differentiated scheduling treatment based on different access technology. Differentiated scheduling treatment may be necessary for handling and for compensating for scheduling problems concerning certain access technologies that might occur, e.g. at congestion or for enabling fairness scheduling between data packet flows belonging to different ATs. The IP header QoS marking together with the AT index enables Hierarchical QoS scheduling, which is described in more detail here below in connection to FIG. 8.

The AT index also enables load balancing using the hash identifier code. Load balancing is described in more detail here below in connection to FIGS. 8A and 8B. The controller 54 is provided with a routing table 52:RT and a hash functionality circuitry 54:HF.

In routing, a routing table may be based on a hash table used to implement an associative array, a structure that can map keys to values. The hash table uses a hash function with an associated hash algorithm, to calculate a hash code which will indicate a routing path in a routing table, from which the routing path can be found.

Ideally, the hash function should assign each possible key to a unique routing path.

The hash function 54:HF comprises a hash algorithm for computing the hash code for an IP data packet flow by means of a 5 tuple of parameters for the IP data packet flow, access technology code and the hash identifier code. Said 5 tuple may comprise source IP address, destination IP address, source port number, destination port number and the protocol in use. The hash code is used in the routing table 54:RT for indicating which of said data paths the IP data packet flow shall be directed to. Thus, data flows having the same hash code will be routed along the same data path by the routing/switching functionality 52.

In the routing table 54:RT, each hash code is related to a routing path. Different routing paths have different values. For load balancing in a data communication network, e.g. transport network, it is therefore possible to route IPsec tunnels marked with the same AT identifier code by means of the AT index comprising a hash identifier code.

The difference between a hash code and a hash identifier code is that the hash code is the result of a hash code computation, while the hash identifier code is an input parameter to the hash code computation.

A data telecommunication network such as a transport network or backhauling network (to an access network) is often based on Internet Protocol IP. IPsec uses two different protocols: Authentication Header and Encapsulation Security Payload to ensure the authentication, integrity and confidentiality of communication.

IPsec can be implemented in two modes of operation: host-to-host transport mode or network tunnel mode.

According to different example of embodiments, the AT index may be inserted in a IPsec data packet header configured according to a Authentication Header protocol of an IPsec tunnel or in a data packet header configured according to a Encapsulation Security Payload protocol of an IPsec tunnel.

Figure 3:
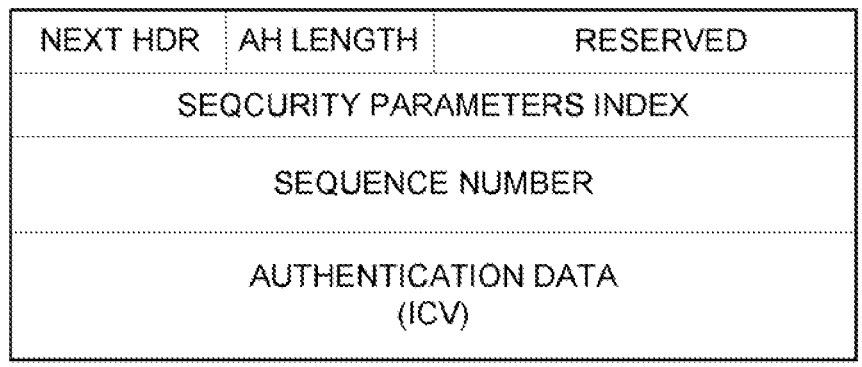
FIG. 3 is a diagram illustrating a data packet header configured according to a Authentication Header protocol.

FIG. 3 illustrates a data packet header configured according to an Authentication Header protocol of an IPsec tunnel.

Authentication Header (AH) is a member of the IPsec protocols. AH guarantees connectionless integrity and data origin authentication of IP packets. In IPv4, the use of AH has the advantage that it protects the IP payload and all header fields of an IP datagram except for mutable fields, which might be altered in transitions. In IPv6, the use of AH has the advantage that the AH protects the most of the IPv6 base header, AH, non-mutable extension headers after the AH, and the IP payload. AH operates directly on top of IP, using IP protocol number 51.

The AH protocol comprises following fields, which hereafter is described with reference to FIG. 3.

Next Header is an 8 bits long field for indicating the type of the next header, i.e. what type of upper-layer protocol that is protected. The value is taken from the list of IP protocol numbers.

AH Length is an 8 bit field for indicating the AH protocol length. The length is indicated I 4-octet units, minus 2 ("0" means 8 octets (2×4=8; 2−2=0), "1" means 12 octets (3×4=12;3−2=1), etcetera). Said field may also be denoted "Payload length". If carried in an IPv6 packet, the length of the header needs to be a multiple of 8 octets.

Reserved field is 16 bits long, is reserved for future use and comprises zeroes so far.

The Security Parameters Index field is 32 bits long and it comprises an arbitrary value which is used together with the destination IP address to identify the security association of the receiving party.

The Sequence Number field is 32 bits long. It comprises a monotonic strictly increasing sequence number, which is incremented by 1 step for every packet sent. It is used for preventing replay attacks. There is a separate counter kept for every security association.

The Authentication Data field, also denoted Integrity Check Value (ICV) field. Said field comprises a Variable length check value. The length of said field is a multiple of 32 bits. It may contain padding to align the field to an 8-octet boundary for IPv6, or a 4-octet boundary for IPv4.

It is suggested herein, that the AT index is in inserted in the Reserved field or Security Parameters Index field of the AH header. The Reserved field is 16 bits long and filled with zeros. The Security Parameters Index field, 8 bits of the 32 bits may be reserved for the AT index. According to one embodiment, 8 bits of said 16 bits may be used for the AT index—3 bits for identifying the originating AT and 5 bits for a hash identifier code. The new 8 bit long AT index in the Reserved field or Security Parameters Index field is used for supporting Hierarchical QoS scheduling and load balancing.

Figure 4:
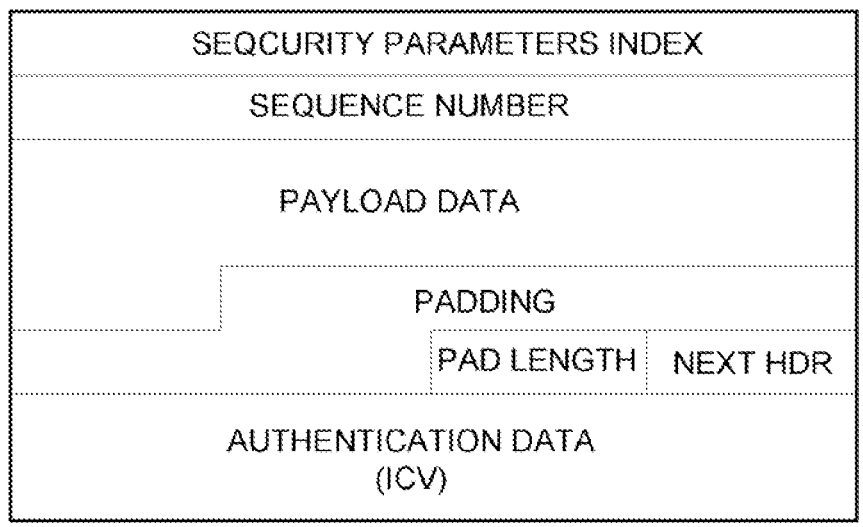
FIG. 4 is diagram illustrating a data packet header configured according to an Encapsulation Security Payload protocol.

FIG. 4 illustrates a data packet header configured according to an Encapsulation Security Payload protocol of an IPsec tunnel.

Encapsulated Security Payload (ESP) is further one member of the IPsec protocol suite.

In IPsec it provides origin authenticity, integrity and confidentiality protection of packets. ESP also supports encryption-only and authentication-only configurations. Unlike AH, ESP in transport mode does not provide integrity and authentication for the entire IP data packet. However, in Tunnel mode, where the entire original IP data packet is encapsulated with a new packet header added, ESP protection is afforded to the whole inner IP data packet (including the inner header) while the outer header (including any outer IPv4 options or IPv6 extension headers) remains unprotected. ESP operates directly on top of IP, using IP protocol number 50.

The Security Parameters Index (SPI) is a 32 bits field comprises an arbitrary value used together with the destination IP address to identify the security association of the receiving party.

The Sequence Number field is 32 bits long. It comprises a monotonic strictly increasing sequence number, which is incremented by 1 step for every packet sent. It is used for preventing replay attacks. There is a separate counter kept for every security association.

The Payload data (variable) field contains the protected contents of the original IP packet, including any data used to protect the contents, e.g. an Initialisation Vector for the cryptographic algorithm. The type of content that was protected is indicated by the Next Header field.

The Padding field is 0-255 octets long. The padding is used to extend the payload data to a size that fits the encryption's cipher block size, and to align the next field.

The Pad Length is 8 bits long. It indicates the size of the padding. The pad length value is the number of octets.

Next Header field is an 8 bits long field for indicating the type of the next header, i.e. what type of upper-layer protocol that is protected. The value is taken from the list of IP protocol numbers.

The Authentication Data field, also denoted Integrity Check Value (ICV) field. Said field comprises a Variable length check value. The length of said field is a multiple of 32 bits. It may contain padding to align the field to an 8-octet boundary for IPv6, or a 4-octet boundary for IPv4.

According to this embodiment, the AT index is in inserted in the Security Parameter Index field. The SPI field is 32 bits long. For example, 8 bits of said 32 bits may be used for the AT index—3 bits for identifying the originating AT and 5 bits for a hash identifier code, and remaining 24 bits are used as the normal SPI identifier. The new 8 bit long AT index in the SPI field is used for supporting Hierarchical QoS scheduling and load balancing.

A scheduling policy of a routing/switching device will therefore be able to consider the access technology of the received data packets and compensate for any unfair advantages for certain data packets during the scheduling process.

How the AT index could be inserted and used will now be described in the following with reference to the proposed embodiments of a node illustrated in FIG. 2 and methods illustrated in FIGS. 5 and 6.

As illustrated in FIG. 2, the node 12 comprises means 23 for enabling control of data packet flow belonging to different access technologies to be sent with the same Quality of Service class over an aggregated encrypted Internet Protocol security tunnel, IPsec tunnel. Said means comprises a receiver 28 configured to receive data packet flow and to identify which access technology each received data packet belongs to. Said means further comprises encrypting means 26 configured to encrypt and encapsulate one or more received data packets as payload in an IP data packet to be sent over an aggregated IPsec tunnel, and marking means 24 being configured to mark a header of the IPsec tunnel with an access technology index comprising a code for the identified access technology of the one or more received data packets encrypted and encapsulated as payload in the IPsec tunnel. The indicated QoS may be copied into the IPsec header from the IP packets. Said means further comprises a sender 28 configured to send the IP data packets via the aggregated encrypted IPsec tunnel.

The sender- and receiver 28, marking means 24 and encrypting means may be implemented as e.g. a processor or digital processor circuitry receiving instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such internal hard disks and removable disks; magneto-optical disks; and CD-ROM disks.

Figure 5:
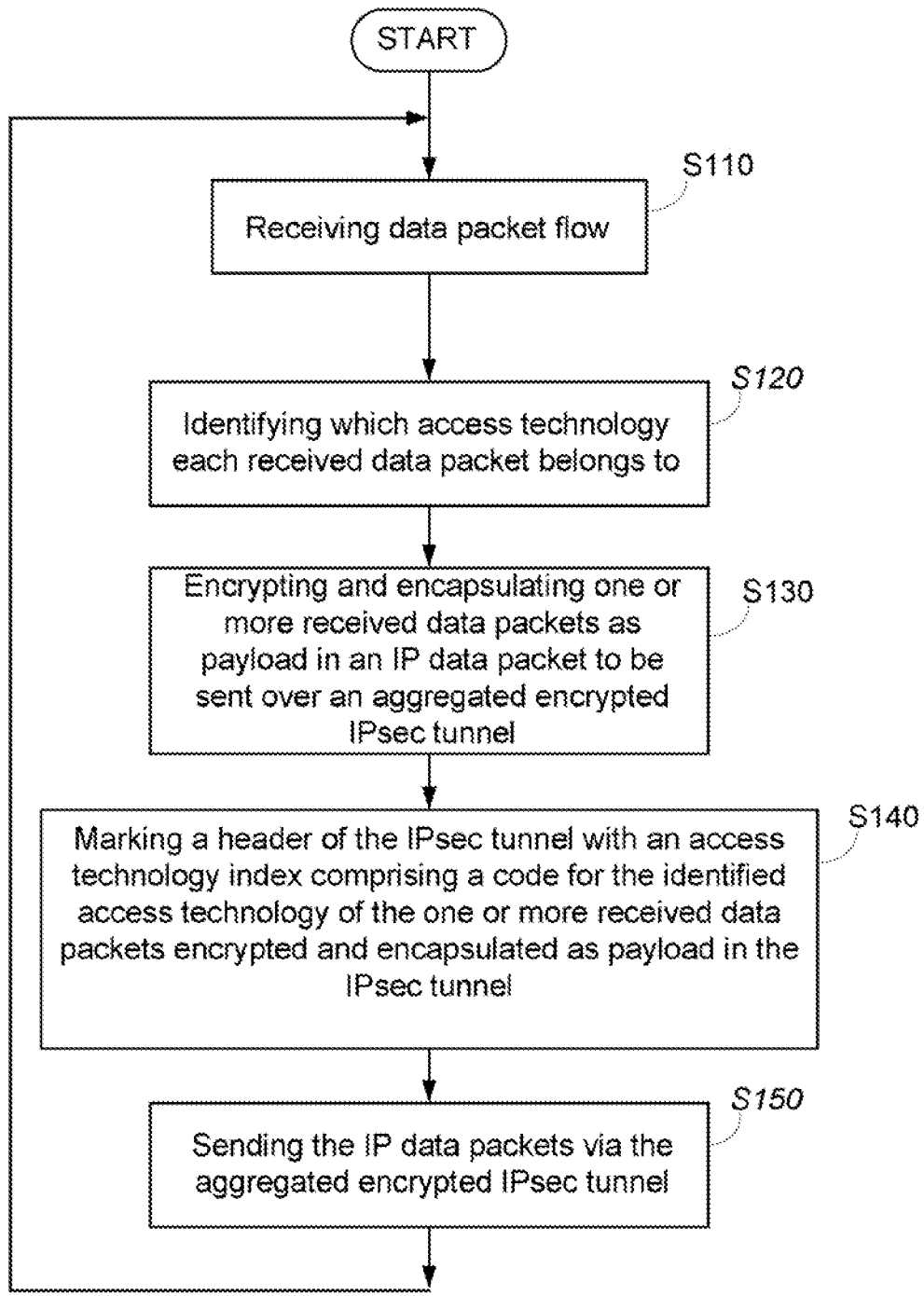
FIG. 5 is a flowchart of an embodiment of a method performed in a node comprising a Radio Base Station.

In FIG. 5, an embodiment of a method is illustrated. The method is performed in a node 12 comprising an RBS, or devices for connecting fixed access technologies. The RBS or AN is communicating wirelessly with a number of UEs. Different UEs may operate according to different Radio Access Technologies, ATs.

S110: Receiving data packet flow. The RAT circuitries in the Radio Base Modules 14-20 (FIG. 2) receive the user data packets from different UEs connected to the access node 12. Each RAT circuitry sorts the user data packets, loads the user data packets into the payload field of an IP data packet, having a header, and forwards them to Sender/Receiver means 28 controlled by the controller 22. The header comprises QoS information, e.g. Traffic class.

S120: Identifying which access technology each received data packet belongs to. The Sender/Receiver 28 by means of the controller 22 is configured to identify the access technology and Quality of Service. The controller 22 handles the received data packets.

S130: Encrypting and encapsulating one or more received data packets as payload in an IP data packet to be sent over an aggregated encrypted IPsec tunnel. The controller 22 comprises encryption means 26 configured to encrypt and encapsulate each IP data packet by providing said packets with a new IPsec tunnel header. The tunnel is aggregated as it is a common path for data packet flows from the node.

S140: Marking a header of the IPsec tunnel with an access technology index comprising a code for the identified access technology of the one or more received data packets encrypted and encapsulated as payload in the IPsec tunnel. The controller 22 comprises marking means 24 and a table in a storage comprising an access technology identification code for each possible access technology, e.g. RAT of the RBS. The marking means 24 is also configured to copy the QoS of the IP data header's content the IP header of the IPsec tunnel. The marking means 24 inserts the selected access technology identification code into the AT index. Different embodiments are possible due to which data packet header is used.
1) In a data packet header configured according to an encapsulation security payload protocol the AT index is inserted e.g. in the Security Parameters Index field.
2) In a data packet header configured according to the authentication header protocol the access technology index may be inserted either in the reserved field or Security Parameters Index field.

S150: Sending the IP data packets via the aggregated encrypted IPsec tunnel. The controller 22 is configured to send by means of a sender 28 the IP data packets through the same established IPsec tunnel from the RBS to a destination gateway.

Figure 6:
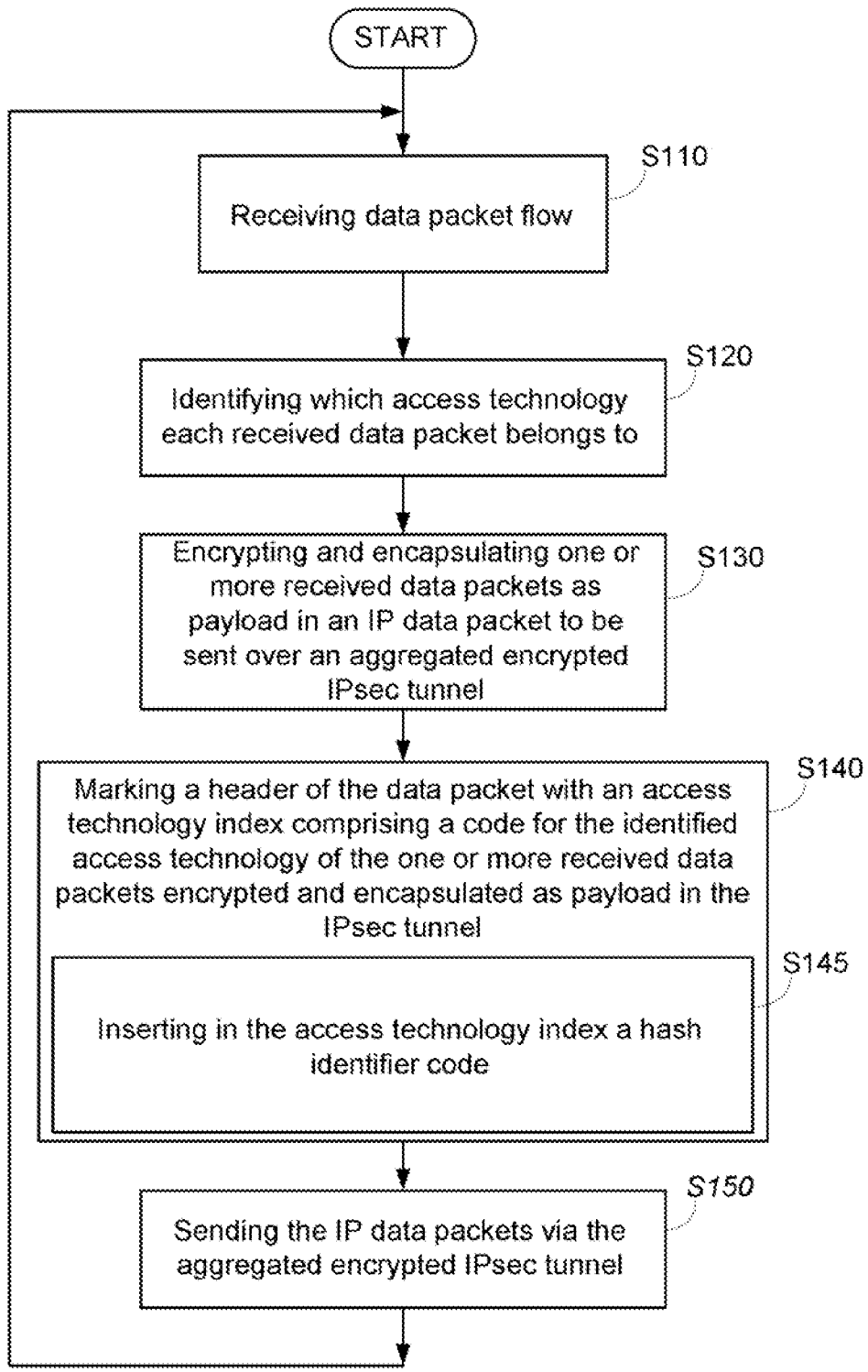
FIG. 6 is a flowchart of another embodiment of a method performed in a node comprising a Radio Base Station.

The flowchart in FIG. 6 illustrates an embodiment of the method described above, see FIG. 5. As illustrated in FIG. 6, the marking of a header, S140, involves:

S145: Inserting in the access technology index a hash identifier code. Said hash code is calculated by the hash identifier code calculator 34 using a hash algorithm. In data parameters to the hash algorithm are the IP-addresses and/or port numbers of source and destination nodes of the end users. The hash codes are computed by and provided from the hash identifier code calculator 34 (see FIGS. 2 and 10).

Figure 10:
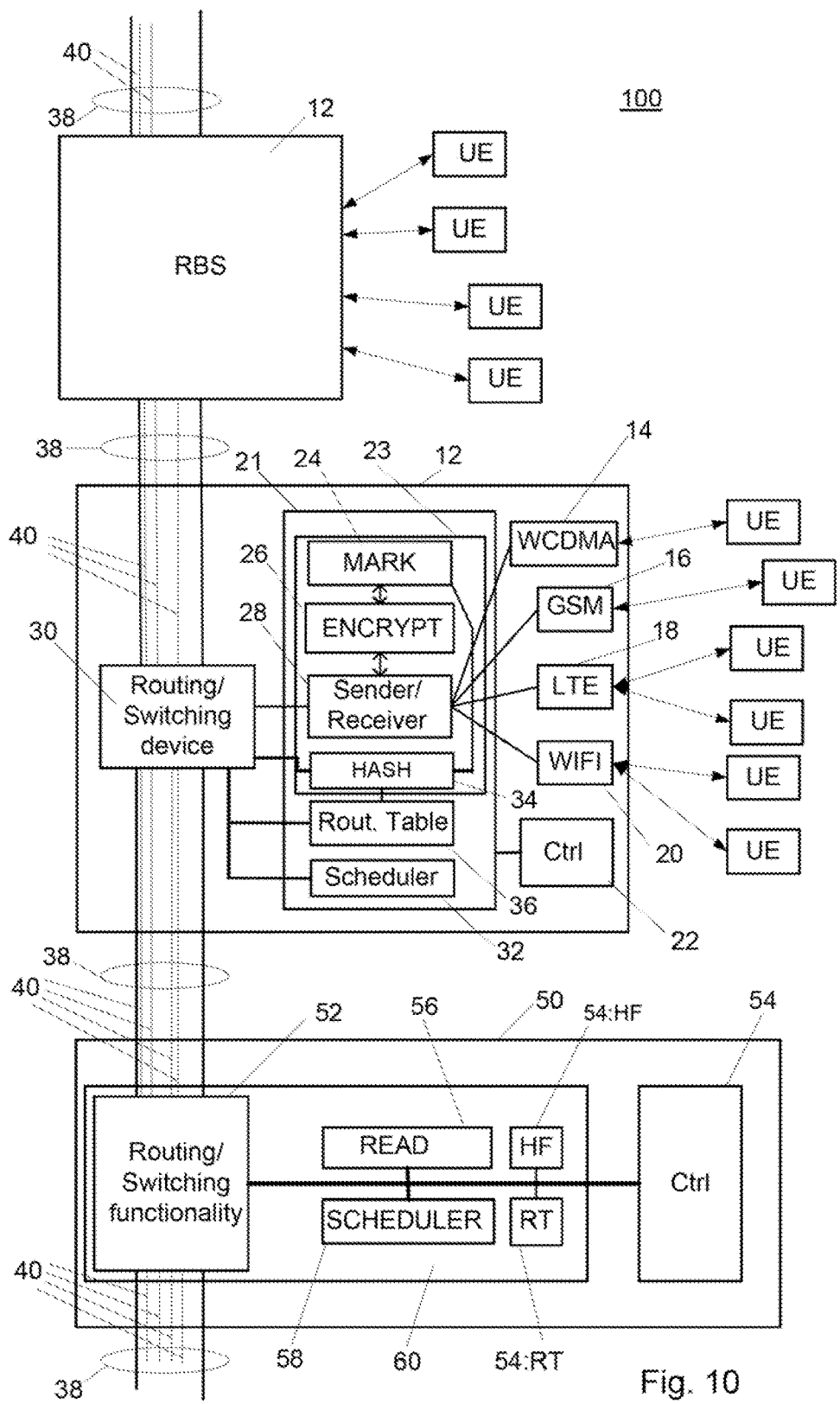
FIG. 10 is a block diagram illustrating further nodes and functionality blocks in said nodes according to one aspect described herein.

FIG. 10 illustrates the similar part of a telecommunications network 100 as is illustrated and described in FIG. 2. Similar details and components of the embodiments in FIG. 2 and FIG. 10 are indicated with similar reference numbers. FIG. 10 illustrates an alternative implementation of the nodes 12 involving RBS and routing and/or switching functionality 50.

The above described method may be implemented in a node 12 as illustrated in FIG. 10. The node enables control of data packet flow belonging to different access technologies to be sent with the same Quality of Service class over an aggregated encrypted Internet Protocol security tunnel 40, IPsec tunnel. Said node comprises a processor 22 and memory 21. Said memory 21 containing instructions executable by said processor whereby said node 40 is operative to:
- receiving data packet flow (S110);
- identifying which access technology each received data packet belongs to (S120);
- encrypting and encapsulating one or more data received packets as payload in an IP data packet to be sent over an aggregated encrypted IPsec tunnel (S130); and
- marking a header of the IPsec tunnel with an access technology index comprising a code for the identified access technology of the one or more received data packets encrypted and encapsulated as payload in the IPsec tunnel (S140);
- Sending the IP data packets via the aggregated encrypted IPsec tunnel (S150).

The radio access technology index is marked by inserting in the IPsec header configured according to an encapsulation security payload protocol. The IPsec header is configured according to the encapsulation security payload protocol which comprises a Security Parameters Index field in which the access technology index is inserted.

Alternatively, the radio access technology index is marked in the IPsec header configured according to an authentication header protocol, which comprises a reserved field and a Security Parameters Index field, the access technology index being inserted in one of said fields.

The node is further configured to insert a hash identifier code into the access technology index.

Figure 7:
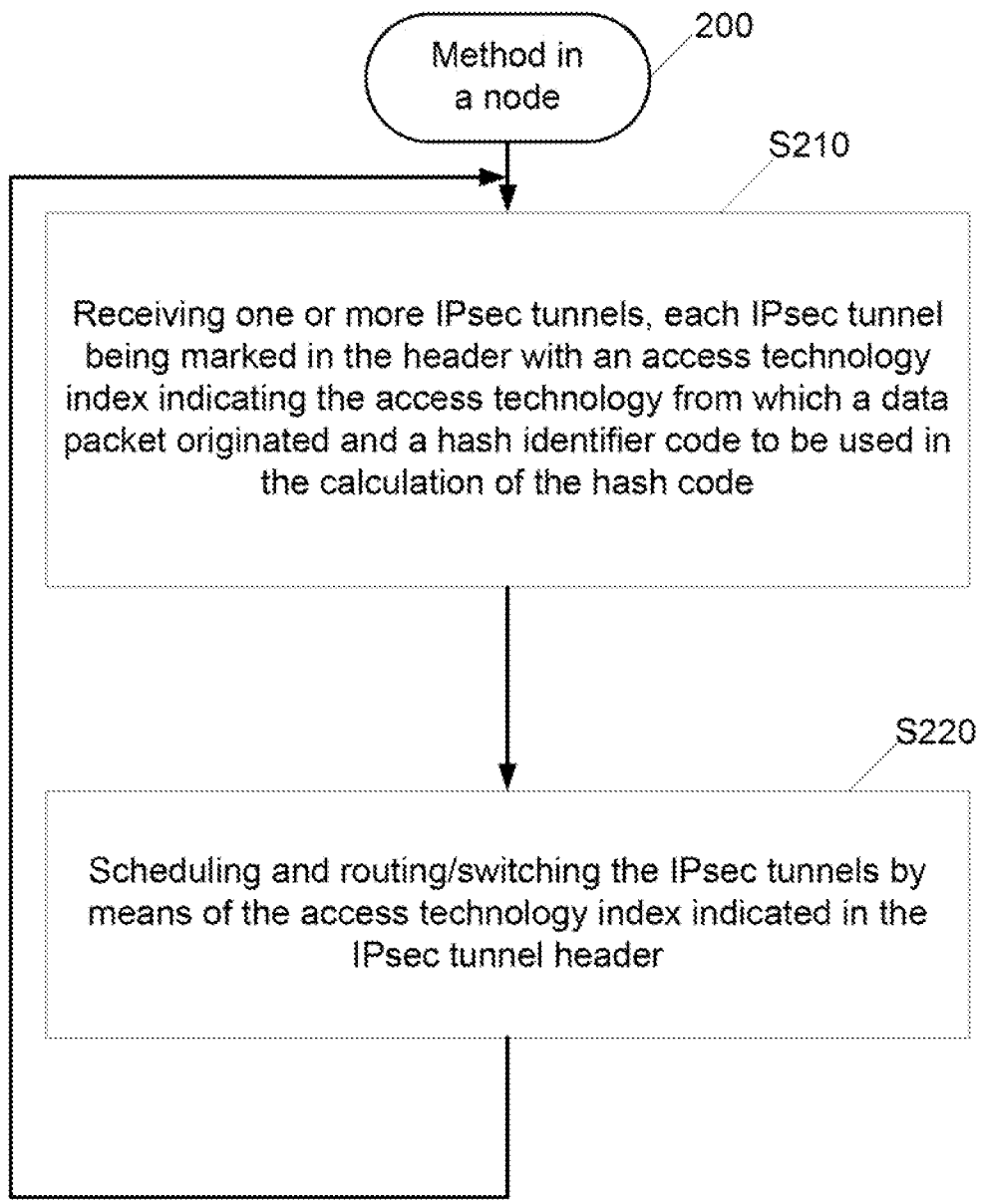
FIG. 7 is a flowchart of an embodiment of a method performed in a node comprising a routing and/or switching functionality.

In FIG. 7, some embodiments of a method for controlling data packet flows, e.g. scheduling and routing or switching of IP data packets, based on AT index information regarding the user data packets in the payload is illustrated. The method is performed in a node (e.g. 50 in FIG. 2) having routing and/or switching functionality (52 in FIG. 2).

S210: Receiving one or more IPsec tunnels comprising IP data packets, each IPsec tunnel being marked in the header with an access technology index indicating the access technology from which a data packet originated and a hash identifier code to be used in the calculation of a hash code. One or more IPsec tunnels 40 comprising the IP data packets passes through the node 50 having a routing and/or switching device 52. Traffic for the same traffic class is queued in the same QoS queue, but the technology marking makes it possible to apply QoS policies or profiles for traffic per technology and traffic class at each aggregation point/node in a network and queue the traffic in the same or different QoS queues. Each IPsec tunnel 40 carries data packets loaded with user data packets originating from one or more Access Technology AT. Each IP data packet has a payload of user data packets originating from one of the ATs. Thus, the payload does not carry user data packets from different ATs at the same time. Each IP data packet in an IPsec tunnel has been provided with an IPsec tunnel header, which is an outer header.

S220: Scheduling and routing/switching the IP data packets by means of the access technology index indicated in the IPsec tunnel header. For the scheduling a pre-set access technology scheduling policy may be used. The routing or switching functionality means 52 is controlled by a controller 54 which is configured with means 56 to read and check the headers of the IPsec tunnels 40. It comprises a scheduler 58 that schedules the IP data packets according the content of their headers and a scheduling policy dedicated to the node and the routing/switching device 52. If the header of an IPsec tunnel header comprises the AT index, fair scheduling between data packet flows originating from different ATs are enabled. The hash identifier code in the AT index is further used by the routing and/or switching means 52:3 for achieving load balancing e.g. when Equal Cost Multi Path (ECMP) or Link Aggregation Group (LAG) protocol is used. The controller 54:3 comprises routing table, RT, 54:RT and a hash function, HA, 54:HF.

The hash function 54:HF comprises a hash algorithm for computing the hash code for an IP data packet flow by means of a 5 tuple of parameters for the IP data packet flow, access technology code and the hash identifier code. Said 5 tuple may comprise source IP address, destination IP address, source port number, destination port number and the protocol in use. The hash code is used in the routing table 54:RT for indicating which of said data paths the IP data packet flow shall be directed to. Thus, data flows having the same hash code will be routed along the same data path.

The above described method may be implemented in a node 12, 50 as illustrated in FIG. 10. The node 12, 50 and embodiments thereof are provided for scheduling and/or routing or switching of IPsec tunnels 40 in a node 12, 50 of an access network or transport network of a data telecommunication network. The node comprises a scheduler, routing or switching functionality 30, 52. Said node further comprises a processor 22, 54 and memory 21, 60. Said memory 60 containing instructions executable by said processor whereby said node 12, 50 is operative to the method comprising:

Receiving one or more IPsec tunnels comprising IP data packets, each IPsec tunnel being marked in the header with an access technology index indicating the access technology from which a data packet originated and a hash identifier code to be used in the calculation of a hash code (S210);

Scheduling and routing/switching the IP data packets by means of the access technology index indicated in the IPsec tunnel header (S220).

The scheduling may be hierarchical based on the access technology code in the access technology index. The scheduling of the IPsec tunnels may be hierarchical based on the indicated Quality of Service in the IPsec tunnel header.

The node is configured to read the access technology index which is marked in a field of an IPsec header, e.g. an authentication header or encapsulation security payload header.

The access technology index may be used for load balancing routing between different path routes to a destination address.

The access technology index comprises an access technology code indicating either one of a number of fixed access technologies or radio access technologies, as described herein.

The embodiments of the nodes may be implemented in digital electronically circuitry, or in computer hardware, firmware, software, or in combinations of them. Described embodiments of certain methods, devices, means or apparatus may be implemented in a computer program product tangibly embodied in a machine readable storage device for execution by a programmable processor; and method steps of the invention may be performed by a programmable processor executing a program of instructions to perform functions of the invention by operating on input data and generating output.

The different method and node embodiments may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language if desired; and in any case, the language may be a compiled or interpreted language.

Generally, a processor or digital processor circuitry such as the controllers 22, 54 (see FIG. 2 and FIG. 10) in the nodes 12, 50 will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such internal hard disks and removable disks; magneto-optical disks; and CD-ROM disks. Any of the foregoing may be supplemented by, or incorporated in, specially-designed ASICs (Application Specific Integrated Circuits).

In the following description, applications and advantages with the above described methods will be further taught.

Figure 8A:
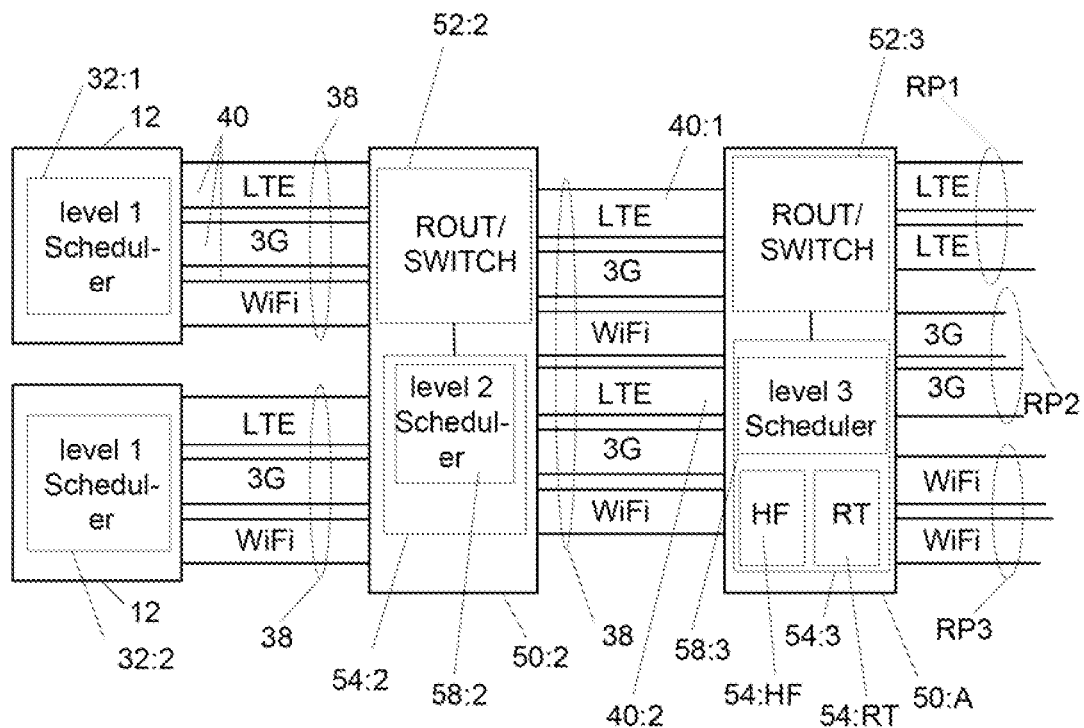
FIGS. 8A and 8B are a block diagram illustrating a schematic network structure wherein hierarchical QoS scheduling is applied.
Figure 8B:
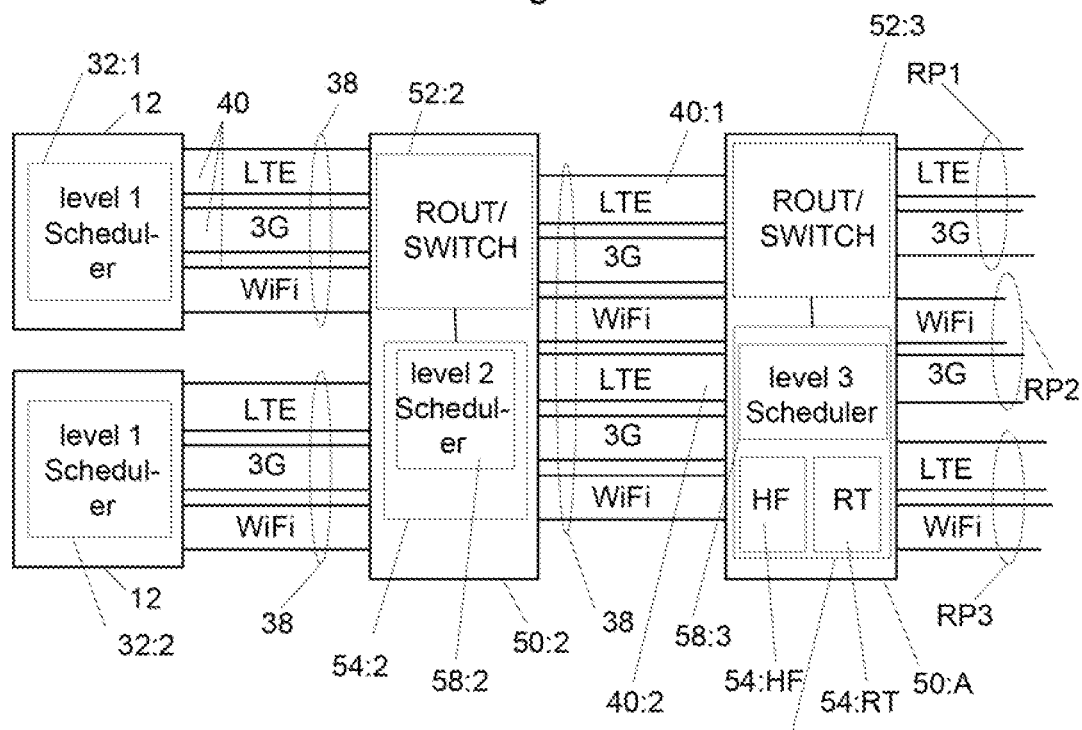

FIGS. 8A and 8B illustrates a schematic network structure wherein hierarchical QoS scheduling is applied.

Differentiated scheduling treatment may be necessary for handling and for compensating for scheduling problems concerning certain radio technologies that might occur, e.g. at congestion.

Hierarchical QoS scheduling provides a number of possibilities:

Multiple levels of packet scheduling;
Support of integrated class-based shaping and queuing;
Fair queuing and drop policies on a per-class, e.g. traffic class, basis.

The above described marking of the IP data packets in the IP tunnel flows enables Hierarchical QoS scheduling. Hierarchical QoS scheduling is a scheduling performed in several levels. The multiple levels of hierarchical scheduling are supported by a hierarchical engine, which is a kind of controller, i.e. digital processor circuitry configured to execute control software. The basic principle is that a first level scheduler feeds data packet flows to the next level of scheduler, which feeds the data packet flows to the next level, the third level. Thus, there is a scheduler in each level. With each of these schedulers, a separate classification and scheduling algorithm can be applied at each level.

In the example of FIGS. 8A and 8B, a part of a telecommunication network is illustrated. Radio Base Stations 12 are access points and access nodes for user equipments (see FIG. 1) operating according to any radio access technology, e.g. LTE, 3G, WiFi. In the upstream direction, towards an aggregation network and transport network, IP data packet flows are sent in IPsec tunnels 40. IP data packets related to a specific AT having the same QoS class are sent in a common IPsec tunnel by means of a first level scheduler, level 1 scheduler, 32:1 hosted in RBS 12. The IPsec tunnels are sent via a conductor 38 to a node 50:2 comprising routing and/or switching means 52:2 connected to a controller 54:2, which involves a second level scheduler, level 2 scheduler, 58:2. Node 50:2 is an aggregation point for several RBSs 12. The scheduler 58:2 is configured to aggregate the IPsec tunnels into one common conductor 38, wherein IPsec tunnels for IP data packet flows of the same QoS but different ATs are scheduled equal bandwidth according to fairness scheduling by means of the AT index.

The aggregated IPsec tunnels are sent to a node 50:A, which comprises routing and/or switching means 52:3 connected to a controller 54:3, which involves a third level scheduler, level 3 scheduler, 58:3. The third level scheduler 58:3 may be a fairness scheduler for allocating equally bandwidth capacity to IPsec tunnels of different AT but with the same QoS by means of the AT index.

The hash identifier code in the AT index is further used by the routing and/or switching means 52:3 for achieving load balancing e.g. when Equal Cost Multi Path (ECMP) or Link Aggregation Group (LAG) protocol is used. The controller 54:3 comprises routing table, RT, 54:RT and a hash function, HA, 54:HF.

The difference between a hash code and a hash identifier code is that the hash code is the result of a hash code computation, while the hash identifier code is an input parameter to the hash code computation.

The hash function 54:HF comprises a hash algorithm for computing the hash code for an IP data packet flow by means of a 5 tuple of parameters for the IP data packet flow, access technology code and the hash identifier code. Said 5 tuple may comprise source IP address, destination IP address, source port number, destination port number and the protocol in use. The hash code is used in the routing table 54:RT for indicating which of said data paths the IP data packet flow shall be directed to. Thus, data flows having the same hash code will be routed along the same data path.

By using the hash identifier code and/or AT identifier code as input parameter together with a 5 tuple of parameters for the IP data packet flow in the hash algorithm for computing the hash code. Optionally, QoS may also be used as input parameter in the hash algorithm together with the 5 tuple and AT index parameters when calculating a hash code.

Example 1

If a hash code is calculated based on the 5 tuple and access technology code only, IPsec tunnels comprising data packet flows originating from the same access technology get the same hash code and will accordingly be scheduled and routed on the same routing path indicated by the routing table 54:RT. In FIG. 8A, IPsec tunnels comprising LTE data packet flows are scheduled and routed on routing path RP1, where IPsec tunnels comprising 3G flows are scheduled and routed on routing path RP2, and IPsec tunnels comprising WiFi flows are scheduled and routed on routing path RP3. Thus, the hash identifier code of the access technology index has not been used as an input parameter in the hash algorithm of the hash function 54:HF when computing the hash code. Only the AT code and the 5 tuple was used. The different routes RP1, RP2 and RP3 from node 50:A are illustrated in FIG. 9.

Example 2

If a hash code is calculated based on the 5 tuple and access technology code and the hash identifier code. As the hash identifier codes in different IPsec tunnels are not the same, this will result in different hash codes from the hash code calculation in the hash function 54. Different hash codes indicate different routing paths in the routing table 54:RT, which will have the result that IPsec tunnels comprising data packet flows of the same access technology are scheduled and routed on different routing paths, as illustrated in FIG. 8B.

Figure 9:
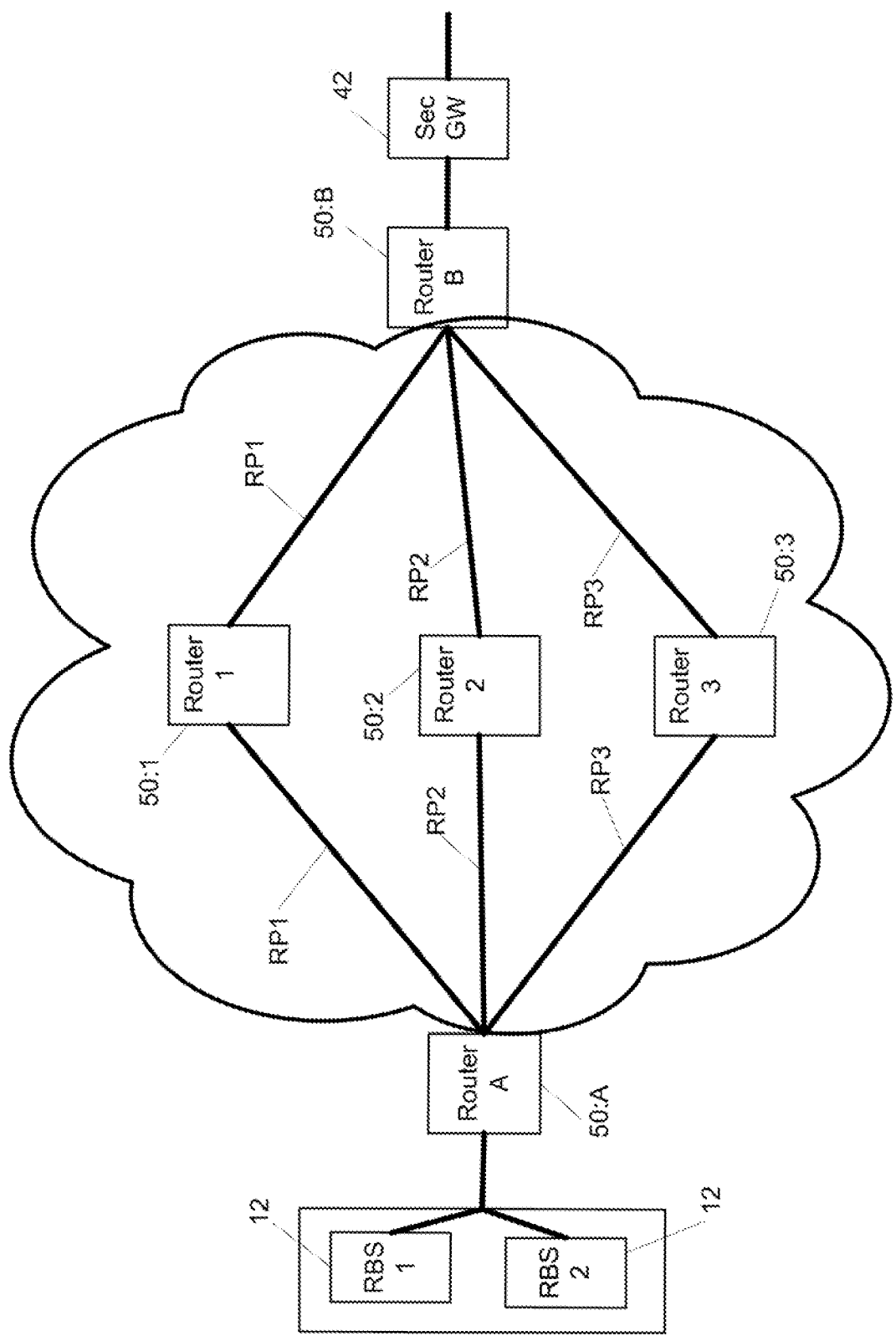
FIG. 9 is a block diagram illustrating an access network providing different routes wherein load balancing is applicable.

FIG. 9 illustrates data telecommunication network providing different routes between a source node and a security gateway node.

In the example in FIG. 9, the IPsec tunnels ends at the Security Gateway, SecGW, 40. Through the transport network, the IPsec tunnels may be routed or switched via different routing paths RPx from node 50:A comprising Router A to the SecGW 40 via node 50:B comprising a router B. In the example, three routes RP1, RP2, RP3 are available. RP1 passes a node 50:1 comprising a router 1, RP2 passes a node 50:2 comprising a router 2, and RP3 passes a node 50:3 comprising a router 3. The traffic load, i.e. the amount of IP data packet flow, and available bandwidth capacity may vary through time resulting in congestion in any of the routing paths. The congestion problem in a routing path may be solved by load balancing, as router A changes its routing table and routes the IPsec tunnels having a certain AT index from the congested RP to a RP having no congestion problem.

A skilled person in the art realizes that the above described embodiments provide solutions for identifying data traffic flows in the same QoS class belonging to different technologies to be able to give these flows different treatment. One advantage with the above described embodiments wherein a access technology index inserted in the header of IPsec tunnels is that it makes it possible to differentiate the data flow based on access technologies and other criteria used when calculating the hash identifier code even if they belong to the same traffic class, i.e. require the same Quality of Service, and the IP packets are sent inside the same encrypted tunnel.

A number of embodiments have been described. It will be understood that various modifications may be made without departing from the scope of these embodiments. Therefore, other implementations of the described embodiments are within the scope of the following claims.

The invention claimed is:

1. Method implemented by a node for enabling control of data packet flows belonging to different access technologies to be sent with the same Quality of Service class over an aggregated encrypted Internet Protocol security tunnel, IPsec tunnel, the method comprising:
   receiving data packet flows;
   identifying which access technology each received data packet belongs to;

encrypting and encapsulating one or more data received packets as payload in an IP data packet to be sent over an aggregated encrypted IPsec tunnel;

marking a header of the IPsec tunnel with an access technology index comprising a code for the identified access technology of the one or more received data packets encrypted and encapsulated as payload in the IPsec tunnel; and, sending the IP data packets via the aggregated encrypted IPsec tunnel.

2. The method according to claim 1, wherein the radio access technology index is marked in the IPsec header configured according to an encapsulation security payload protocol.

3. The method according to claim 2, wherein the IPsec header is configured according to the encapsulation security payload protocol which comprises a Security Parameters Index field in which the access technology index is inserted.

4. The method according to claim 1, wherein the radio access technology index is marked in the IPsec header configured according to an authentication header protocol.

5. The method according to claim 4, wherein the IPsec header is configured according to the authentication header protocol comprising a reserved field and a Security Parameters Index field, the access technology index being inserted in either the reserved field or the Security Parameters Index field.

6. The method according to claim 1, wherein the marking involves:

inserting in the access technology index a hash identifier code.

7. A method for scheduling, and at least one of routing, and switching of Internet Protocol security tunnels (IPsec tunnels) in a node of an access network or transport network of a data telecommunication network, the node comprising a scheduler, and at least one of a routing functionality and switching functionality, the method comprising receiving one or more IPsec tunnels comprising IP data packets, each IPsec tunnel being marked in the header with an access technology index indicating the access technology from which a data packet originated and a hash identifier code to be used in the calculation of a hash code; and, scheduling and at least one of routing and switching the IP data packets by using the access technology index indicated in the IPsec tunnel header.

8. The method according to claim 7, wherein the scheduling is hierarchical based on the access technology code in the access technology index.

9. The method according to claim 8, wherein the scheduling of the IPsec tunnels is hierarchical based on the indicated Quality of Service in the IPsec tunnel header.

10. The method according to claim 9, wherein the method further comprises reading the access technology index marked in a field of an IPsec header.

11. The method according to claim 10, wherein the method further comprises using the access technology index for load balancing between different path routes to a destination address.

12. The method according to claim 11, wherein said access technology index comprises an access technology code indicating either one of a number of fixed access technologies or radio access technologies.

13. The method according to claim 10, wherein the radio access technology index is marked by inserting the radio access technology index in the IPsec header configured according to an encapsulation security payload protocol which comprises a Security Parameters Index field in which the access technology index is inserted, or wherein the radio access technology index is marked in the IPsec header configured according to an authentication header protocol comprising a reserved field and a Security Parameters Index field, the access technology index being inserted in either the reserved field or the Security Parameters Index field.

14. A node in an access network or transport network of a data telecommunication network, the node comprising:

a processor and memory, said memory containing instructions executable by said processor whereby said node is operative to:

receive one or more Internet Protocol security tunnels (IPsec tunnels) comprising IP data packets, each IPsec tunnel being marked in the header with an access technology index indicating an access technology from which a data packet originated and a hash identifier code for calculating a hash code;

schedule the one or more IPsec tunnels comprising IP data packets; and control the scheduling and at least one of routing and switching of the IP data packets based on the access technology index indicated in the IPsec tunnel header.

15. The node according to claim 14, wherein the node is further operable to implement a hierarchical scheduler for performing the scheduling based on the access technology code in the access technology index.

16. The node according to claim 15, wherein the hierarchical scheduler is configured to schedule IPsec tunnels hierarchically based on the indicated Quality of Service in the IPsec tunnel header.

17. The node according to claim 16, wherein the node is further operative to retrieve the access technology index marked in a field of an IPsec header.

18. The node according to claim 17, wherein the node is further operative to use the access technology index for load balancing between different path routes to a destination address.

19. The node according to claim 18, wherein said access technology index comprises an access technology code indicating either one of a number of fixed access technologies or radio access technologies.

20. The node according to claim 17, wherein the radio access technology index is marked by inserting the radio access technology index in the IPsec header configured according to an encapsulation security payload protocol which comprises a Security Parameters Index field in which the access technology index is inserted, or wherein the radio access technology index is marked in the IPsec header configured according to an authentication header protocol comprising a reserved field and a Security Parameters Index field, the access technology index being inserted in either the reserved field or the Security Parameters Index field.

21. A node for enabling control of data packet flow belonging to different access technologies to be sent with the same Quality of Service class over an aggregated encrypted Internet Protocol security tunnel, IPsec tunnel, said node comprises a processor and memory, said memory containing instructions executable by said processor whereby said node is operative to:

receive data packet flow;

identify which access technology each received data packet belongs to;

encrypt and encapsulate one or more data received packets as payload in an IP data packet to be sent over an aggregated encrypted IPsec tunnel;

mark a header of the IPsec tunnel with an access technology index comprising a code for the identified access technology of the one or more received data packets encrypted and encapsulated as payload in the IPsec tunnel; and, send the IP data packets via the aggregated encrypted IPsec tunnel.

22. The node according to claim 21, wherein the radio access technology index is marked in the IPsec header configured according to an encapsulation security payload protocol.

23. The node according to claim 22, wherein the IPsec header is configured according to the encapsulation security payload protocol which comprises a Security Parameters Index field in which the access technology index is inserted.

24. The node according to claim 21, wherein the radio access technology index is marked in the IPsec header configured according to an authentication header protocol.

25. The node according to claim 24, wherein the IPsec header is configured according to the authentication header protocol comprising a reserved field and a Security Parameters Index field, the access technology index being inserted in either the reserved field or the Security Parameters Index field.

26. The node according to claim 21, wherein the node involves:

inserting in the access technology index a hash identifier code.

* * * * *